United States Patent

Werntz

[15] 3,643,789
[45] Feb. 22, 1972

[54] LIVE ROLLER CONVEYOR WITH VARIABLE DRIVE

[72] Inventor: Charles W. Werntz, Ferguson, Mo.
[73] Assignee: Alvey Inc., St. Louis, Mo.
[22] Filed: July 6, 1960
[21] Appl. No.: 52,285

[52] U.S. Cl. ............................................................. 198/127
[51] Int. Cl. ......................................................... B65g 13/02
[58] Field of Search .................................................198/127

[56] References Cited

UNITED STATES PATENTS 3,420,355  1/1969  Good .................................... 198/127
1,883,426  10/1932  Walter .................................. 198/127

FOREIGN PATENTS OR APPLICATIONS 1,543,311  9/1968  France .................................. 198/127

*Primary Examiner*—Edward A. Sroka
*Attorney*—Gravely, Lieder & Woodruff

[57] ABSTRACT

A live roller conveyor having a belt drive for the load supporting rollers and means to position the drive belt more or less in friction driving contact with the rollers. The drive belt positioning means includes belt carrier rollers, roller positioning eccentrics and clip-on eccentric brackets, all of which is distributable along the length of a conveyor run to provide local drive variations from zero to maximum available power.

11 Claims, 10 Drawing Figures

PATENTED FEB 22 1972 3,643,789
SHEET 1 OF 2
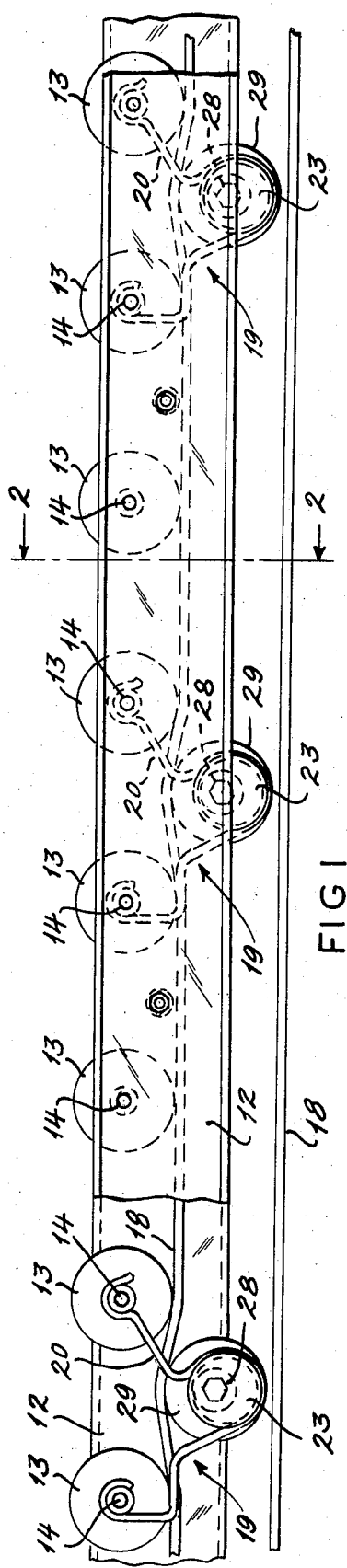
FIG.1
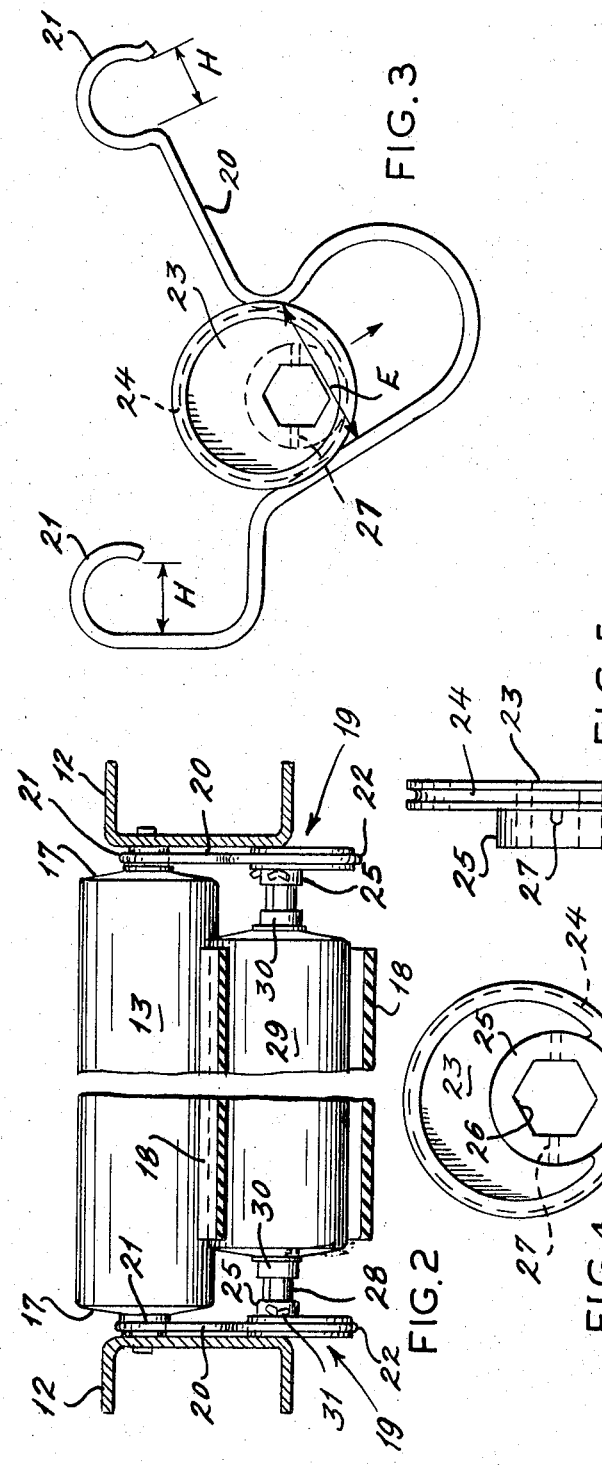
FIG.2
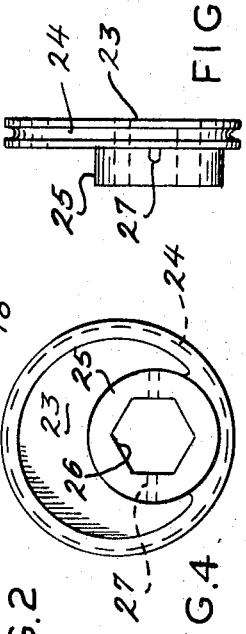
FIG.3
FIG.4
FIG.5

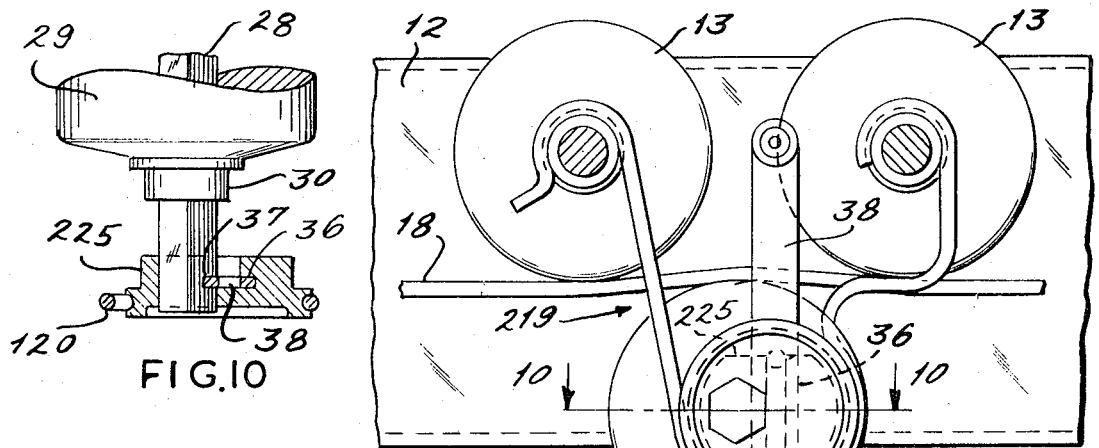
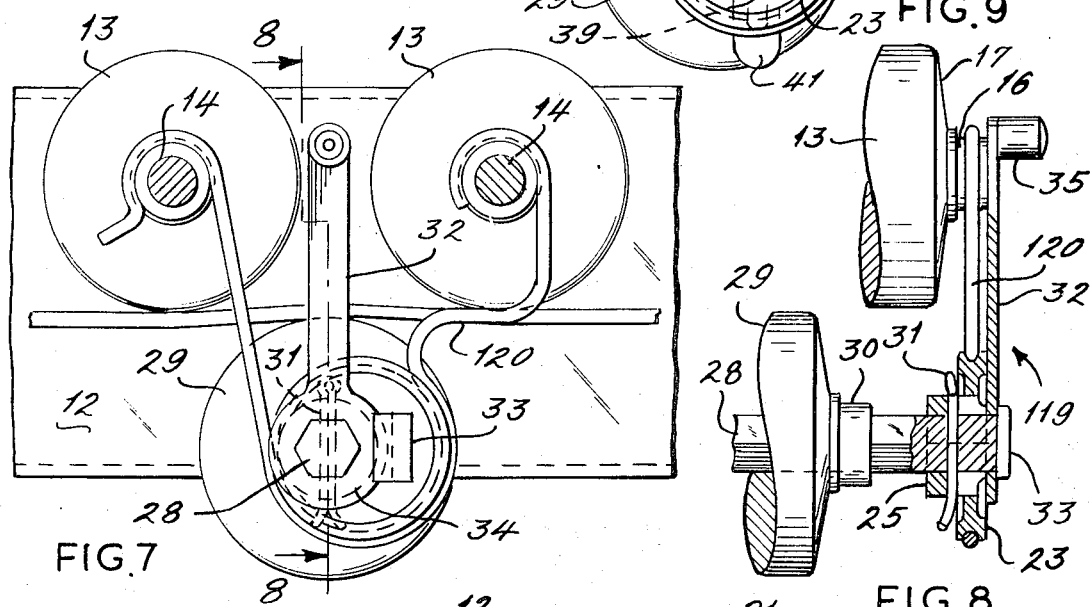
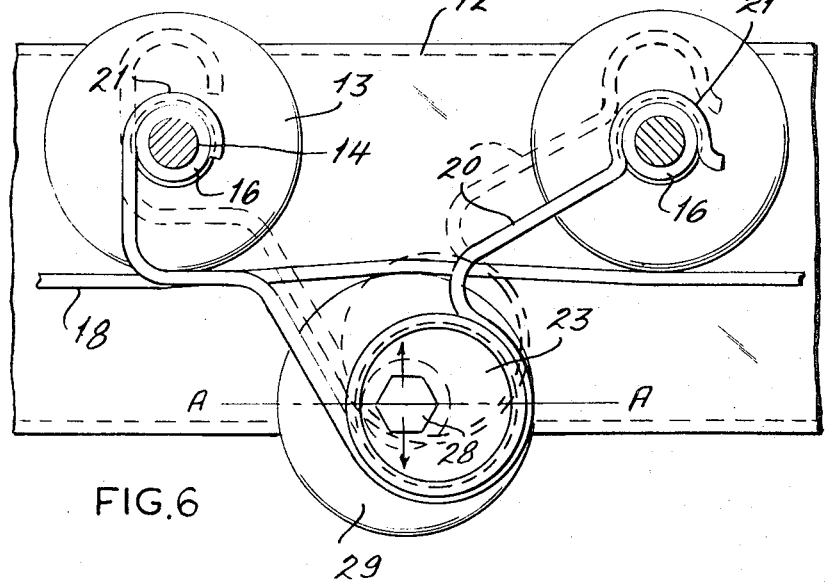

LIVE ROLLER CONVEYOR WITH VARIABLE DRIVE

BRIEF SUMMARY OF THE INVENTION

This invention relates to improvements in live roller conveyors which are powered by a drive belt held against the rollers and delivering the power through friction contact.

In belt-driven live roller conveyors there is a problem which has persisted, and that is that a satisfactory variable drive for the live rollers has not heretofore been available. Variation in the driving effort of the load carrying rollers of a live roller conveyor is highly desirable because of the variation in the weight of the loads being conveyed. The weight of the load being conveyed is related to the frictional drag imposed on the driving belt so that as the loads become heavier it requires more power to drive the supporting rollers.

There is also the problem of controlling the impact effect of loads where a leading object is blocked in some manner so it cannot move forward. The trailing objects will normally gang up and because of the driving effect of the belt the rollers carrying the following objects will constantly tend to drive the objects will constantly tend to drive the objects forward, thus imposing substantial crushing loads on the lead object which has been blocked.

So far there is not available to the industry a live roller conveyor that is capable of being adjusted in a simple manner so as to provide along a length or run of conveyor one or more zones where the driving effect of the friction belt can be reduced substantially so as to provide a dead zone or a low drive zone preceded and followed by zones of substantial driving effort. Accordingly, it is an object of the present invention to overcome the problems enumerated above and other problems related thereto, and to provide a simple and inexpensive drive adjustment means for live roller conveyors.

The invention is directed to live roller conveyor assemblies in which a plurality of load transporting rollers at suitable spaced intervals are arranged in a common load transporting array so that an endless driving belt may have a pass in frictional driving contact with the transporting rollers and a return pass. In such a conveyor, frictional drive adjustment means is operably disposed adjacent selected pairs of the transporting rollers so as to more or less snub the endless driving means relative to the transporting rollers, thereby adjusting the driving friction. The frictional drive adjusting means includes brackets supported at the opposite ends of the transporting rollers to provide bearing seats for eccentric means rotatable relative to the bearing seats and carrying a shaft for a snub control roller so that rotation of the eccentric means relative to the bearing seat is effective to move the control rollers selectively toward and away from the pair of transporting roller for increasing and decreasing, respectively, the frictional driving contact.

The invention also resides in the parts and components and the assembly thereof hereinafter to be described.

BRIEF DESCRIPTION OF THE DRAWINGS

Preferred forms of the present invention are shown in the accompanying drawings wherein:

FIG. 1 is a fragmentary longitudinal elevational view of a live roller conveyor showing the simple and substantially basic components of the present invention;

FIG. 2 is a transverse sectional elevational view taken at line 2—2 in FIG. 1;

FIG. 3 is an elevational view of the frictional drive adjusting means incorporated in the live roller conveyor of FIG. 1;

FIG. 4 is a view of the eccentric means as seen from the opposite face from that shown in FIG. 3;

FIG. 5 is an end view of the eccentric means of FIG. 4;

FIG. 6 is a fragmentary view showing the manner of installing the frictional drive adjustment means of FIG. 1;

FIG. 7 is a view similar to FIG. 6 but showing a modified frictional drive adjustment;

FIG. 8 is a fragmentary and partly sectional view taken at line 8—8 in FIG. 7;

FIG. 9 is a further fragmentary elevational view of another modified frictional drive adjustment means; and FIG. 10 is a fragmentary sectional view taken at line 10—10 in FIG. 9.

DESCRIPTION OF THE CONVEYOR ASSEMBLY

Referring now to FIGS. 1 and 2 of the drawing, it can be seen that the live roller conveyor includes laterally spaced channels forming side rails 12 for operatively supporting a plurality of spaced load transporting rollers 13 which are arranged in a common load transporting array with the upper faces of the rollers 13 exposed above the level of the side rails 12. Each of the rollers 13 is supported on a suitable shaft which, in this case, is formed from hexagonal stock, with the end of the shaft 14 projecting through the web of the side rails 12. The rollers 13 are mounted on suitable bearings each of which is formed with a sleeve 16 which is part of the inner bearing race and projects axially outwardly from the respective end faces 17 of the rollers. The sleeves 16 are more clearly shown in FIG. 8.

The rollers 13 are adapted to be driven by frictional contact with the endless driving means 18 which may be a belt formed of suitable material so as to develop frictional contact with the peripheral surfaces of the rollers 13. As is shown in FIG. 1 and 2, the drive means 18 has its upper longitudinal pass arranged to drive the load transporting rollers 13, while its return pass is suitably supported (not necessary to show here) so as to pass below and between the conveyor side rails 12. Frictional drive adjustment means 19 is shown generally in FIGS. 1 and 2 and in more detail in FIGS. 3, 4, 5 and 6, and reference will be made to these several views. Each frictional drive adjustment means (FIG. 3) includes a suitably formed spring wire bracket 20 provided with spaced mounting hooks 21 which are adapted to be engaged over the sleeves 16 for the inner bearing races which project outwardly from the end faces 17 of the load transporting rollers 13. The mounting hooks are formed so that the entrance openings H are slightly smaller than the diameter of the sleeves 16 on which they are engaged. This establishes a snap-on mounting of the frictional drive adjustment means 19. It may not be necessary in all cases to have the entrance openings H for the hooks formed to effect a snap-on engagement with the sleeve 16. The spring wire bracket is formed with a bearing loop 22 remote from the mounting hooks 21, and the dimension E of the entrance to the bearing loop 22 is made slightly smaller than the diameter of the bearing loop.

The bearing loop 22 for the bracket 20 is adapted to secure an eccentric means or disc 23 therein. The eccentric means 23 is shown in detail in FIGS. 4 and 5 and is seen to be formed with a peripheral recessed surface 24 which is sized to ride in the bearing loop 22 of the wire bracket. A hub 25 formed on one face of the eccentric 23 provides adequate surface for the formation of interior flats 26 which are adapted to slideably engage a shaft. In addition to the hub 25, the eccentric means is formed with a slot 27 which extends diametrically of the hub 25 as shown in FIG. 4 and 5. Slot 27 is visible only from the side opposite the hub 25 so it can be utilized as a visual aid in mounting the eccentric means on shaft 28 which is adapted to support the drive control roller 29, and it extends axially (FIG. 5) so it can provide a hole in the hub for a cotter pin 31.

Referring back to FIG. 2 it can be seen that the control roller 29 is mounted on the hexagonal shaft 28 by suitable bearings (not shown) in the opposite ends thereof, and the bearings are provided with projecting sleeves 30 which are part of the inner bearing races. Suitable cotter pin means 31 are provided that lock the respective eccentric means 23 to the shaft 28. The drive control roller 29 has internal means (not shown) to retain the roller 29 on the shaft 28 in a central position so that there is a space or gap adjacent the hub 25 on the respective eccentrics. The exposed portion of the shaft 28 provides a suitable place for the engagement of an open end wrench for turning the shaft 28 which thereby turns the eccentric means 23 in the bearing loops 22 at the opposite sides of the conveyor. With the eccentric means 23 aligned in the same angular position on the shaft 28, as can be visually noted by the position of the slots 27, rotation of the shaft 28 will simultaneously rotate the eccentric means 23 so that the shaft 28 will be moved in an arcuate path which will result in elevating or lowering the drive control roller 29 relative to the load transporting roller 13. This action increases or decreases, respectively, the degree of snubbing of the driving pass of the endless friction belt 18 under the transporting rollers 13.

Turning now to FIGS. 6, it can be seen that the spring wire bracket is easily assembled or moved into its operative position by bringing it up from below the load transporting rollers 13 and between the side rails 12. This can be accomplished with the drive belt 18 in place which greatly simplifies the assembly or repair of the apparatus. Once in position the respective hooks 21 are located with the entrance thereto lined up with the inner bearing sleeves 16 on the shafts 14. The wire bracket 20 may then be snapped downwardly so that the hooks 21 frictionally engage over the sleeves 16 as indicated heretofore. The respective bearing loops 22 for the brackets 20 will be in position to locate the eccentric means 23 between a pair of transporting rollers 13 where the drive control roller 29, supported by the eccentric means 23, will be in a position to be displaced upwardly or downwardly from an intermediate setting depicted by the line A—A. As the eccentric 23 is rotated in a counterclockwise direction as viewed in FIG. 6 it will lower the roller 29 and allow the driving pass of the belt 18 to decrease its contact with the transporting rollers 13 and at the extreme bottom throw of the eccentric 23, the roller 29 will be in a position so that the drive means 18 will just break contact with the transporting rollers 13. Conversely, when the eccentric 23 is rotated in a clockwise direction from the level A—A, the friction contact of the driving means 18 will increase because the means 18 will be more effectively snubbed between the transporting rollers 13.

It can be appreciated that the eccentric means 23 may be formed in a common mold to have them all substantially alike, and they may be made of suitable material such as Nylon, phenolic, zinc or other like materials which are substantially free of galling. In this manner the shaft receiving flats in shaft holes 26 in the hub 25 will all be substantially in the same alignment relative to the point of eccentricity of the hub 25 relative to the center of the bearing loop 22 in the bracket 20. Accordingly, the eccentric means 23 may be very easily aligned at the opposite ends of the shaft 28 for each control roller 29 by visually noting the position of the slot 27 therein. In addition to this advantageous feature the assembly and adjustment of the eccentric means 23 is performed directly on the shaft 28 for the rollers 29 and, therefore, inherent backlash is equal at both eccentrics. Thus, there is no backlash buildup introduced, and any looseness in the shaft receiving hexagonal holes 26 is due to tolerance factors in the shafts. A suitable tool is used to engage and rotate the shaft 28 and this can be done from either side of the conveyor. Ability to adjust the eccentric means 23 from either side of the conveyor is especially advantageous where the distance between the side rails 12 is sufficiently great to prevent the operator reaching across the width of the conveyor.

Turning now to the modified disclosure in FIGS. 7 and 8, it is understood that like parts and elements will be denoted by reference characters heretofore appearing in FIGS. 1 through 6 inclusive. The modified means of FIGS. 7 and 8 includes an adjusting lever 32 incorporated in the frictional drive adjustment means 119. It is to be noted, also, that the spring wire bracket in this modified arrangement is somewhat varied from the bracket 20 shown in FIG. 6. The essential difference is that the modified bracket 120 of FIG. 7 is suitably formed to be utilized with load transporting rollers 13 set on closer center-to-center shafts 14 than is shown in FIG. 6.

The adjusting lever 32 in the modified arrangement is conveniently incorporated by forming the eccentric means 23 with an alignment block 33 on the face opposite the hub 25.

The alignment block 33 is spaced from the aperture formed with the interior flats 26 a suitable distance so as to accommodate and engage the enlarged base 34 which is part of the adjusting lever 32. The alignment block 33 serves to locate each of the adjustable levers 32 on its eccentric means 23, along a run of the conveyor, so that all of the lever means are properly directed upwardly between the path of transporting rollers 13. A suitable pressure pad 35 may be mounted on the outer end of the adjusting lever 32 to make it relatively easy to apply pressure of sufficient amount to move the lever 32 in the desired direction for increasing or decreasing the frictional contact of the drive means 18 on the transporting rollers 13.

A further modification is shown in FIGS. 9 and 10 and wherever possible, like reference characters will be applied to denote parts heretofore described. The friction drive adjusting means is shown at 219 in FIG. 9 and includes the spring wire bracket 120 heretofore described in FIG. 7. In the modified arrangement, eccentric 23 is provided with an enlarged hub 225 such that a slot 36 might be formed in the hub 225 and directed substantially parallel with the plane of the eccentric 23. A part of the slot 36 is directed to intercept the shaft receiving opening in the hub 225, and the shaft 29 to be mounted in this opening is provided with a slot 27 formed at such an axial position that the slot 37 will line up in the same plane with the slot 36 when the shaft 29 is substantially flush with the outer face of the eccentric 23.

The eccentric 23 is adapted to be locked to shaft 29 by means of an adjustment lever 38 which is of a width to simultaneously engage into the respective slots 36 and 37. When the adjusting lever 38 is simultaneously engaged in the slots 36 and 37 it locks the eccentric 23 to the shaft 29 and at the same time establishes an engagement with the shaft 29 so that angular movement of the lever 38 will effect rotation of the shaft 29 and thereby adjust the eccentric 23 in the bearing loop of the wire bracket 121. The adjusting lever 38 may be retained in working engagement with the eccentric 23 by forming a keeper slot 39 therein and incorporating a lock pin 40 in a position to engage in the upper end of slot 39. When the lever 38 is slid outwardly so as to open the hub 225 for removal of the eccentric, the closed end 41 will prevent the lever 38 from being completely withdrawn from the hub 225.

SUMMARY OF THE DISCLOSURE

From the foregoing description of certain preferred embodiment of the present invention it should be readily apparent that the apparatus embodies the snub action requirements to increase or decrease the driving force to be derived from an endless drive belt working in conjunction with load transporting rollers. In addition, the present assembly embodies the important features of permitting infinite drive force adjustment for the load transporting rollers so as to vary from zero to maximum; and it permits logical adjusting procedure with simple open end wrench means or with built-in-adjusting means so that the position of the adjusting means relative to the load transporting rollers will be an indication of the extent of adjustment. Also, there is now available means capable of being installed on existent conveyors without any extensive alterations; and means designed for ease of removal and/or installation with the conveyor in its commercial setting so as to avoid expensive and time consuming operations.

What is claimed is:

1. A live roller conveyor comprising: a plurality of load transporting rollers spaced apart and fixed in a common load transporting array; an endless drive means passed adjacent said transporting rollers for frictional driving contact with such rollers; and frictional drive adjustment means operably disposed adjacent selected pairs of said transporting rollers, said adjustment means including brackets supported at the opposite ends of said transporting rollers and each opposed pair of said brackets providing a circular bearing seat having horizontally aligned centers depending a predetermined distance from adjacent selected rollers, an element rotatably mounted in each circular bearing seat and having a shaft receiving aperture therein with said shaft aperture eccentric to the center of said circular bearing seat, a shaft carried at its ends in said shaft apertures of opposed rotatable elements, and a control roller on each said shaft in position to engage said endless drive means, rotation of said rotatable elements in said circular seats moving said shaft aperture in an arcuate path eccentric to said circular seat centers to selectively move said control roller toward and away from said pair of rollers and effect a like movement of said endless drive means for respectively increasing and decreasing the frictional driving contact.

2. The live roller conveyor of claim 1 wherein each bracket is formed with mounting hooks engageable adjacent said selected pair of transporting rollers and with a looped portion constituting said bearing seat.

3. The live roller conveyor of claim 1 wherein said rotatable elements and bearing seat snap together with said bearing seat exerting a circumferential constricting force upon said rotatable elements to retain said rotatable elements in selected positions.

4. The live roller conveyor of claim 1 wherein said shaft is formed with flat surfaces, said rotatable elements include mounting apertures having interior flat surfaces matching those of said shaft, said flat surfaces of said shaft being partly exposed adjacent said rotatable elements to receive an adjusting tool thereon.

5. The live roller conveyor of claim 1 wherein each bracket bearing seat is generally circular and has an open side and each rotatable means has a circular peripheral recessed surface engaged on said bracket bearing seat, the diameter of said peripheral surface of said rotatable elements being greater than the size of said open side of said bracket bearing seat.

6. In a live roller conveyor, a series of in line article carrying rollers defining an article conveying path along the tops of said rollers, endless drive means extending along below and in driving relation to said rollers and having a drive pass adjacent said rollers and a return pass spaced from said rollers, a series of support rollers disposed along said article conveying path between said passes of said endless drive means, and means holding said support rollers in contact with said drive pass of said endless drive means, said holding means including adjustable elements rotatable through a range of substantially 180° to provide infinite adjustment within said range, said adjustment effecting driving relation of said endless means on said article carrying rollers which varies from a maximum to no driving contact.

7. The live roller conveyor of claim 6 wherein said holding means for the support rollers and said support rollers are sized to sit between and said adjustable elements are circular to ride in said saddle, said circular return passes of said drive means with said drive means in place along said article carrying rollers.

8. The live roller conveyor of claim 6 wherein said support roller holding means comprises a bracket formed with a circular saddle between its ends, and said adjustable elements are circular to ride in said saddle, said circular elements having eccentric located hubs engaged by said support rollers, whereby said supporting rollers are selectively adjusted upon rotating said elements in said saddles.

9. The live roller conveyor of claim 6 wherein said holding means are formed spring wires each having a saddle loop and hooked ends to engage the conveyor adjacent a pair of article carrying rollers, and said adjustable elements are eccentric discs rotationally mounted in said saddle loops, said saddle loops exerting a hoop force on said discs to retain them in rotationally adjusted positions.

10. In a live roller conveyor the combination of longitudinal frame members spaced apart, a plurality of article carrying rollers having shafts mounted between said spaced frame members with the ends of said rollers spaced from said frame members, endless drive means having a drive pass underlying said article carrying rollers and a return pass remote therefrom, supporting rollers underlying and engaged with said drive pass of said endless drive means, bracket means for opposite ends of said supporting rollers engaged on said article carrying roller shafts in the space between said article carrying rollers and frame members, and adjustable means carried by and rotatable relative to said bracket means and engaged with said supporting rollers, said adjustable means for each said supporting roller being movable in unison through said supporting roller and varying the article propelling drive force transmitted from the drive pass of said endless drive means to said article carrying rollers between zero and a maximum.

11. The live roller conveyor of claim 10 wherein said bracket means has a removable snap fit on said roller shafts, and said adjustable means includes eccentric discs carried by said bracket means and rotatable therein to provide infinite variations in the drive force.

* * * * *

UNITED STATES PATENT OFFICE
CERTIFICATE OF CORRECTION

Patent No. 3,643,789          Dated February 22, 1972

Inventor(s) Charles W. Werntz

It is certified that error appears in the above-identified patent and that said Letters Patent are hereby corrected as shown below:

Column 6, lines 5 and 6, after "between" in line 5, cancel the phrase:

"and said adjustable elements are circular to ride in said saddle, said circular return passes"

and substitute therefor: --

"said drive and return passes".

Signed and sealed this 18th day of July 1972.

(SEAL)
Attest:

EDWARD M. FLETCHER, JR.          ROBERT GOTTSCHALK
Attesting Officer                Commissioner of Patents